(12) United States Patent
Namgoong et al.

(10) Patent No.: US 7,672,383 B2
(45) Date of Patent: Mar. 2, 2010

(54) NOISE VARIANCE ESTIMATION IN WIRELESS COMMUNICATIONS FOR DIVERSITY COMBINING AND LOG-LIKELIHOOD SCALING

(75) Inventors: June Namgoong, San Diego, CA (US); Hao Xu, San Diego, CA (US); Peter J. Black, San Diego, CA (US); Srikant Jayaraman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1066 days.

(21) Appl. No.: 11/047,347

(22) Filed: Jan. 28, 2005

(65) Prior Publication Data

US 2006/0062322 A1    Mar. 23, 2006

Related U.S. Application Data

(60) Provisional application No. 60/611,028, filed on Sep. 17, 2004.

(51) Int. Cl.
*H04L 27/28* (2006.01)
(52) U.S. Cl. .................................. 375/260
(58) Field of Classification Search ................ 375/260, 375/285, 326, 346, 348, 299, 347, 349; 455/83, 455/63.1, 67.13, 218, 101, 132–141; 700/53
See application file for complete search history.

(56) References Cited

U.S. PATENT DOCUMENTS

| 6,628,738 | B1 * | 9/2003 | Peeters et al. ............... 375/371 |
| 2004/0166887 | A1 | 8/2004 | Laroia et al. ................ 455/522 |
| 2005/0107045 | A1 * | 5/2005 | Kroeger ....................... 455/83 |
| 2006/0114981 | A1 * | 6/2006 | Ghosh et al. ................ 375/232 |

FOREIGN PATENT DOCUMENTS

WO    WO 2004/015946 A1    2/2004

OTHER PUBLICATIONS

Zhen, a Novel Channel estimation and Tracking Method for wireless OFDM systems based on Pilots and Kalman Filtering, 2003, IEEE, p. 17-20.*
PCT International Search Report (3 pages).
International Preliminary Report on Patentability - PCT/US05/033133, The international Bureau of WIPO - Geneva, Switzerland, Mar. 20, 2007.
Written Opinion - PCT/US05/033133, International Search Authority - European Patent Office, Jan. 23, 2006.

* cited by examiner

*Primary Examiner*—Sam K Ahn
(74) *Attorney, Agent, or Firm*—Larry J Moskowitz

(57) ABSTRACT

Noise variance estimation in wireless communications. Noise variance estimation includes receiving a signal including an OFDM symbol having, in-band tones including in-band pilot tones, and band-edge tones including band-edge pilot tones and guard tones, estimating an effective noise variance for the in-band tones using the in-band pilot tones and channel estimates for the in-band pilot tones, and estimating an effective noise variance for the band-edge tones using the band-edge pilot tones, channel estimates for the band-edge pilot tones, and the guard tones.

74 Claims, 8 Drawing Sheets

US 7,672,383 B2

NOISE VARIANCE ESTIMATION IN WIRELESS COMMUNICATIONS FOR DIVERSITY COMBINING AND LOG-LIKELIHOOD SCALING

CLAIM OF PRIORITY UNDER 35 U.S.C. §119

The present Application for Patent claims priority to Provisional Application No. 60/611,028, entitled "Noise Variance Estimation for Diversity Combining and Log-likelihood Ratio (LLR) Scaling in Platinum Broadcast" filed Sep. 17, 2004, and assigned to the assignee hereof and hereby expressly incorporated by reference herein.

BACKGROUND

1. Field

The present disclosure relates generally to telecommunications, and more specifically, to noise variance estimation techniques in wireless communications.

2. Background

In a typical telecommunications system, the data to be transmitted is encoded with a turbo code, which generates a sequence of symbols, referred to as "code symbols." Several code symbols may be blocked together and mapped to a point on a signal constellation, thereby generating a sequence of complex "modulation symbols." This sequence may be applied to a modulator, which generates a continuous time signal, which is transmitted over a wireless channel.

At the receiver, the modulation symbols may not correspond to the exact location of a point in the original signal constellation due to noise and other disturbances in the channel. A demodulator may be used to make soft decisions as to which modulation symbols were most likely transmitted based on the received points in the signal constellation. The soft decisions may be used to extract the Log-Likelihood Ratio (LLR) of the code symbols. The turbo decoder uses the sequence of code symbol LLRs to decode the data originally transmitted.

In a receiver employing multiple antennas, a Pilot Weighted Combining (PWC) technique is often used to combine the soft decisions for each antenna. The combined soft decisions may then be used to compute the LLRs for the code symbols. One problem with this approach is the potential difference in thermal noise for each antenna. As a result, the PWC procedure for combining soft decisions may not optimize the Signal-to-Noise Ratio (SNR). Accordingly, there is a need in the art for an improved demodulation process that considers the thermal noise for one or more antennas mounted on a receiver.

SUMMARY

In one aspect of the present invention, a method of estimating noise variance includes receiving a signal including an Orthogonal Frequency Division Multiplexing (OFDM) symbol. The OFDM has in-band tones, including in-band pilot tones, and band-edge tones including band-edge pilot tones, and guard tones. The method further involves estimating an effective noise variance for the in-band tones using the in-band pilot tones and channel estimates for the in-band pilot tones, and estimating an effective noise variance for the band-edge tones using the band-edge pilot tones, channel estimates for the band-edge pilot tones, and the guard tones.

In another aspect of the present invention, a method of estimating noise variance includes receiving a signal including a plurality of OFDM symbols each having in-band tones including in-band pilot tones, and band-edge tones including band-edge pilot tones and guard tones, estimating an effective noise variance for the in-band tones of one of the OFDM symbols by estimating a noise variance for the in-band tones of one or more of the OFDM symbols, weighting the noise variance estimates, combining the weighted noise variance estimates, and scaling the combined weighted noise variance estimates, and estimating an effective noise variance for the band-edge tones of said one of the OFDM symbols using the band-edge pilot tones for said one of the OFDM symbols, channel estimates for the band-edge pilot tones for said one of the OFDM symbols, and the guard tones for said one of the OFDM symbols.

In yet another aspect of the present invention, a method of estimating noise variance includes receiving a signal including a plurality of OFDM symbols each having in-band tones including in-band pilot tones, and band-edge tones including band-edge pilot tones and guard tones, estimating an effective noise variance for the in-band tones of one of the OFDM symbols using the in-band pilot tones for said one of the OFDM symbols and channel estimates for said one of the OFDM symbols, the channel estimates being time averaged over two or more of the OFDM symbols, and estimating an effective noise variance for the band-edge tones of said one of the OFDM symbols using the band-edge pilot tones for said one of the OFDM symbols, channel estimates for the band-edge pilot tones for said one of the OFDM symbols, and the guard tones for said one of the OFDM symbols.

In a further aspect of the present invention, a method of estimating noise variance includes receiving a signal including a plurality of OFDM symbols each having in-band tones including in-band pilot tones, and band-edge tones including band-edge pilot tones and guard tones, estimating an effective noise variance for the in-band tones of one of the OFDM symbols using the in-band pilot tones for said one of the OFDM symbols and channel estimates for said one of the OFDM symbols, and estimating an effective noise variance for the band-edge tones of said one of the OFDM symbols by estimating an average effective noise variance for the band-edge tones from the band-edge pilot tones for said one of the OFDM symbols, the channel estimates for the band-edge pilot tones for said one of the OFDM symbols, and the guard tones for said one of the OFDM symbols, assigning the edge tones of the OFDM symbol to an effective noise variance equal to the maximum of the average effective noise variance for the band-edge tones and the effective noise variance for the in-band tones, and interpolating the effective noise variance for the band-edge tones between the effective noise variance of the edge tones and the effective noise variance of the in-band tones.

In yet a further aspect of the present invention, a demodulator configured to receive a signal including an OFDM symbol having in-band tones including in-band pilot tones, and band-edge tones including band-edge pilot tones and guard tones, the demodulator including a channel estimator configured to generate channel estimates for the in-band pilot tones and channel estimates for the band-edge pilot tones, an in-band estimator configured to estimate an effective noise variance for the in-band tones using the in-band pilot tones and the channel estimates for the in-band pilot tones, and a band-edge estimator configured to estimate an effective noise variance for the band-edge tones using the band-edge pilot tones, the channel estimates for the band-edge pilot tones, and the guard tones.

In another aspect of the present invention, a demodulator configured to receive a signal including a plurality of OFDM symbols each having in-band tones including in-band pilot tones, and band-edge tones including band-edge pilot tones and guard tones, the demodulator including a channel estimator configured to generate channel estimates for the band-edge pilot tones of one of the OFDM symbols, an in-band estimator configured to estimate an effective noise variance for the in-band tones of said one of the OFDM symbols by estimating a noise variance for the in-band tones of one or more of the OFDM symbols, weighting the noise variance estimates, combining the weighted noise variance estimates, and scaling the combined weighted noise variance estimates, and a band-edge estimator configured to estimate an effective noise variance for the band-edge tones of said one of the OFDM symbols using the band-edge pilot tones for said one of the OFDM symbols, channel estimates for the band-edge pilot tones for said one of the OFDM symbols, and the guard tones for said one of the OFDM symbols.

In yet another aspect of the present invention, a demodulator configured to receive a signal including a plurality of OFDM symbols each having in-band tones including in-band pilot tones, and band-edge tones including band-edge pilot tones and guard tones, the demodulator including a channel estimator configured to generate channel estimates for the in-band pilot tones of one of the OFDM symbols and channel estimates for the band-edge pilot tones of said one of the OFDM symbols, the channel estimates for the in-band pilot tones for said one of the OFDM symbols being time averaged over two or more of the OFDM symbols, an in-band estimator configured to estimate an effective noise variance for the in-band tones of said one of the OFDM symbols using the in-band pilot tones for said one of the OFDM symbols and the channel estimates for said one of the OFDM symbols, and a band-edge estimator configured to estimate an effective noise variance for the band-edge tones of said one of the OFDM symbols using the band-edge pilot tones for said one of the OFDM symbols, the channel estimates for the band-edge pilot tones for said one of the OFDM symbols, and the guard tones for said one of the OFDM symbols.

In a further aspect of the present invention, a demodulator configured to receive a signal including a plurality of OFDM symbols each having in-band tones including in-band pilot tones, and band-edge tones including band-edge pilot tones and guard tones, the demodulator including a channel estimator configured to generate channel estimates for the in-band pilot tones of one of the OFDM symbols and channel estimates for the band-edge pilot tones of said one of the OFDM symbols, an in-band estimator configured to estimate an effective noise variance for the in-band tones of said one of the OFDM symbols using the in-band pilot tones for said one of the OFDM symbols, and a band-edge estimator configured to estimate an effective noise variance for the band-edge tones of said one of the OFDM symbols by estimating an average effective noise variance for the band-edge tones for said one of the OFDM symbols from the band-edge pilot tones for said one of the OFDM symbols, the channel estimates for the band-edge pilot tones for said one of the OFDM symbols, and the guard tones for said one of the OFDM symbols, assigning the edge tones of the OFDM symbol to an effective noise variance equal to the maximum of the average effective noise variance for the band-edge tones for said one of the OFDM symbols and the effective noise variance for the in-band tones for said one of the OFDM symbols, and interpolating the effective noise variance for the band-edge tones between the effective noise variance of the edge tones and the effective noise variance of the in-band tones.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
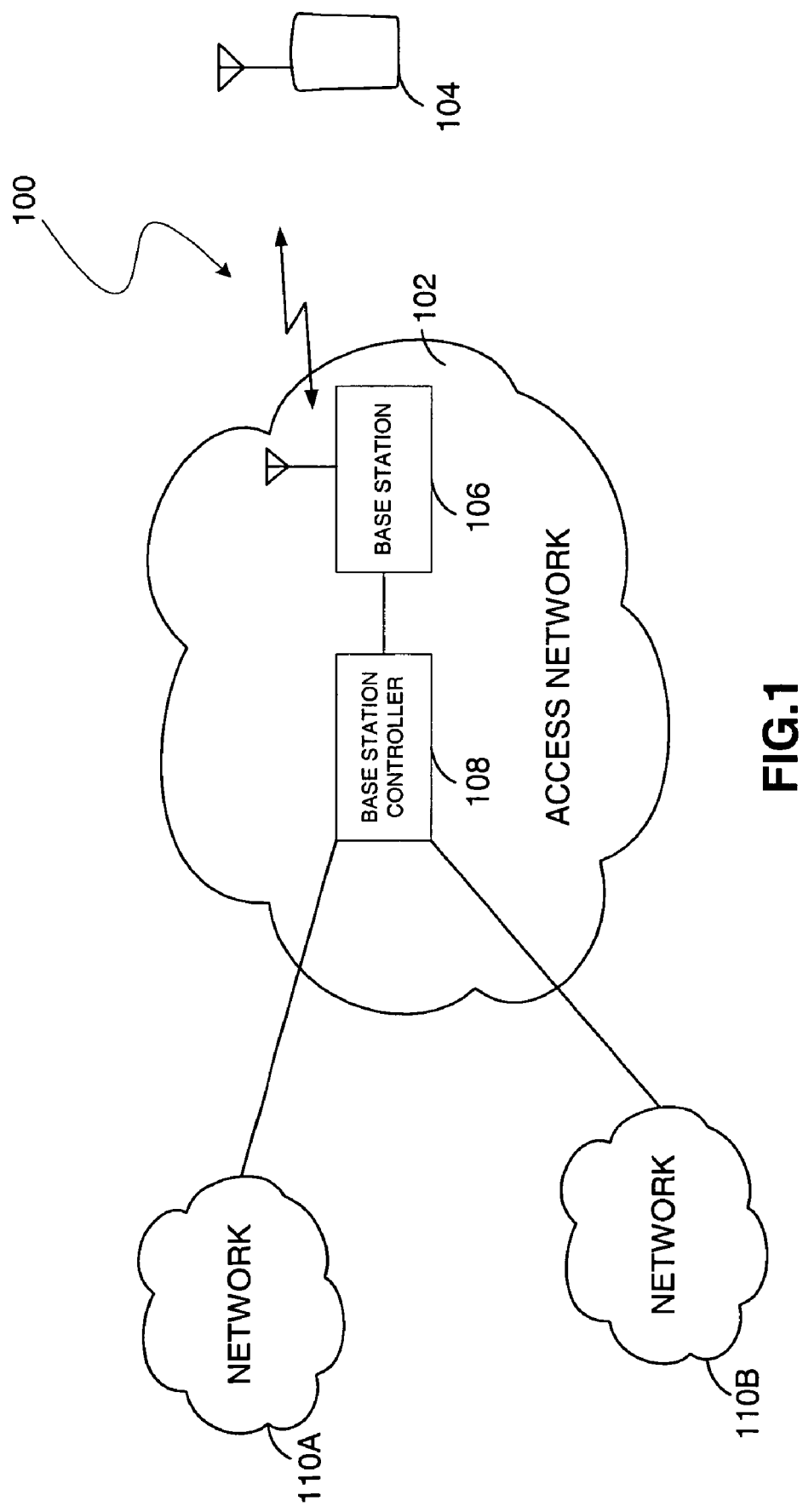
FIG. 1 is a conceptual block diagram illustrating an example of a telecommunications system.

FIG. 1 is a conceptual block diagram illustrating an example of a telecommunications system. The telecommunications system 100 may include an Access Network (AN) 102 which supports communications between any number of ATs 104. The AN 102 may also be connected to additional networks 110A and 110B outside the AN 102, such as the Internet, a corporate intranet, a Public Switched Telephone Network (PSTN), a broadcast network, or any other network. The Access Terminal (AT) 104 may be any type of fixed or mobile device that can communicate with the AN 102 including but not limited to a wireless handset or telephone, a cellular telephone, a data transceiver, a paging receiver, a position determination receiver, a modem, or the any other wireless terminal.

The AN 102 may be implemented with any number of base stations dispersed throughout a geographic region. The geographic region may be subdivided into smaller regions known as cells with a base station serving each cell. In high traffic applications, the cell may be further divided into sectors with a base station serving each sector. For simplicity, one Base Station (BS) 106 is shown. A Base Station Controller (BSC)

108 may be used to coordinate the activities of multiple base stations, as well as provide an interface to the networks outside the AN 102.

Figure 2:
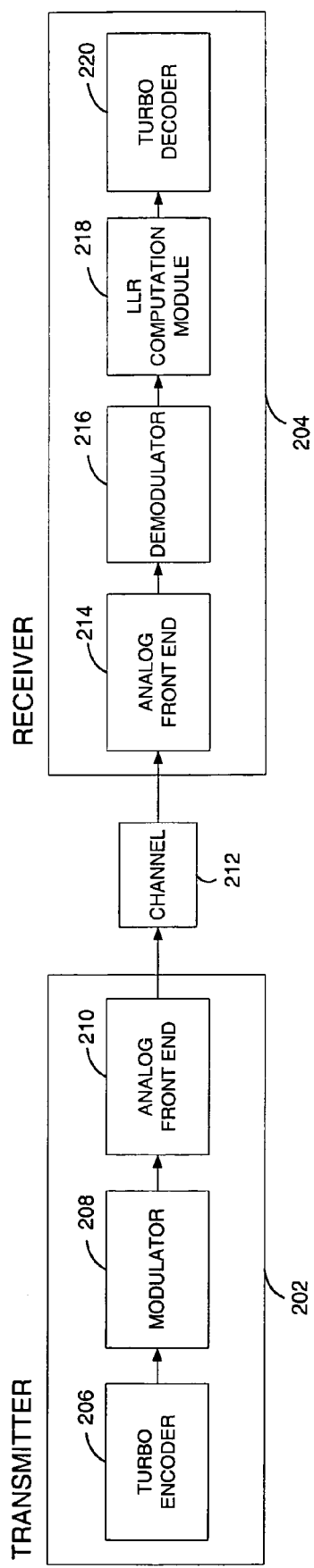
FIG. 2 is a conceptual block diagram illustrating an example of a transmitter in communication with a receiver.

FIG. 2 is a conceptual block diagram illustrating an example of a transmitter in communication with a receiver. The transmitter 202 and receiver 204 may be stand-alone entities, or integrated into a telecommunications system. In a telecommunications system, the transmitter 202 may be in the base station 106 and the receiver 204 may be in the AT 104. Alternatively, the transmitter 202 may be in the AT 104 and the receiver 204 may be in the base station 106.

At the transmitter 202, a Turbo encoder 206 may be used to apply an iterative coding process to the data to facilitate Forward Error Correction (FEC). The coding process results in a sequence of code symbols with redundancy used by the receiver 204 to correct errors. The code symbols may be provided to a modulator 208 where they are blocked together and mapped to coordinates on a signal constellation. The coordinates of each point in the signal constellation represents the baseband quadrature components that are used by an analog front end 210 to modulate quadrature carrier signals before transmission over a wireless channel 212.

An analog front end 214 in the receiver 204 may be used to convert the quadrature carrier signals to their baseband components. A demodulator 216 may translate the baseband components back to their correct points in the signal constellation. Because of noise and other disturbances in the channel 212, the baseband components may not correspond to valid locations in the original signal constellation. The demodulator 216 detects which modulation symbols were most likely transmitted by correcting the received points in the signal constellation by the channel's frequency response, and selecting valid symbols in the signal constellation which are closest to the corrected received points. These selections are referred to as "soft decisions." Soft decisions are used by LLR computation module 218 to determine the LLR of the code symbols. A turbo decoder 220 uses the sequence of code symbol LLRs to decode the data originally transmitted.

The telecommunications system may be implemented with any number of different technologies. Code Division-Multiple Access (CDMA), which is well known in the art, is just one example. CDMA is a modulation and multiple access schemes based on spread-spectrum communications. In a CDMA telecommunications system, a large number of signals share the same frequency spectrum; as a result, such as system provides high user capacity. This is achieved by transmitting each signal with a different code, and thereby, spreading the spectrum of the signal waveform. The transmitted signals are separated in the receiver by a demodulator that uses a corresponding code to despread the signal. The undesired signals, i.e. signals having a different code, are not despread and contribute to noise.

Orthogonal Frequency Division Multiplexing (OFDM) is another example of a technology that can be implemented by a telecommunications system. OFDM is a spread-spectrum technique wherein data is distributed over a large number of carriers spaced apart at precise frequencies. The spacing provides "orthogonality" to prevent a receiver from seeing frequencies other than those intended for the receiver. OFDM, which is also well known in the art, is commonly used for commercial and private broadcasts, but is not limited to such applications.

In at least one embodiment of the telecommunications system, a hybrid multi-access scheme may be employed using both CDMA and OFDM communications. This hybrid system has been gaining widespread acceptance in the area of broadcast services integrated into existing infrastructures, wherein such infrastructures were originally designed to support point-to-point communications between a transmitter and receiver. In other words, the one-to-one type communication system is also being used for one-to-many broadcast transmissions by use of OFDM modulation in combination with other technologies. In these systems, the transmitter may be used to puncture OFDM symbols into a CDMA waveform.

Figure 3:
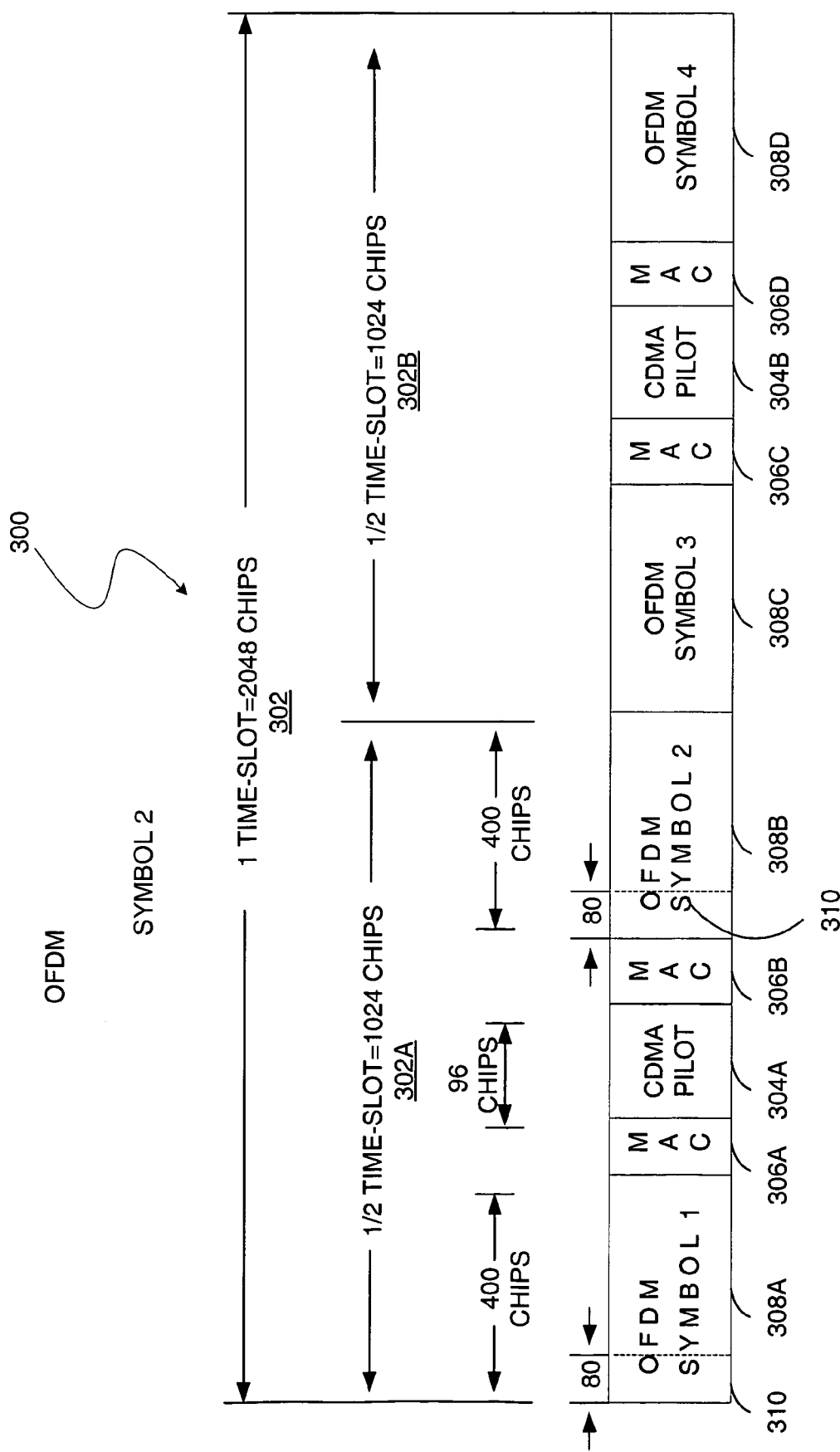
FIG. 3 is an example of a transmission waveform for a hybrid multi-access telecommunications system supporting both CDMA and OFDM communications.

FIG. 3 is an example of a transmission waveform for a hybrid multi-access telecommunications system supporting both CDMA and OFDM communications. The structure of the transmission waveform, as well as the specified time durations, chip lengths, and value ranges are provided by way of example with the understanding that other time durations, chip lengths, and value ranges may be used without departing from the underlying principles of operation of the telecommunications system. The term "chip" is referred to herein as a unit of time of a binary digit output by a spread-spectrum code generator. This example is consistent with a system supporting the protocol "cdma2000 High Rate Packet Data Air Interface Specification," TIA/EIA/IS-856.

The transmission waveform 300 may be defined in terms of frames. A frame may include 16 time-slots 302, each time-slot 302 corresponding to 2048 chips. Time slot 302 having a 1.66 millisecond (ms) time-slot duration, and consequently, a 26.66 ms frame duration. Each time-slot 302 may be divided into two half-time-slots 302A, 302B, with CDMA pilot tone bursts 304A, 304B transmitted within each half-time-slot 302A, 302B, respectively. Each CDMA pilot tone burst 304A, 304B may be 96 chips, centered about a mid-point of its associated half-time-slot 302A, 302B. A Medium Access Control (MAC) channel 306A, 306B, 306C, 306D may comprise two bursts, which are transmitted immediately before and immediately after the pilot tone burst 304A, 304B of each half-time-slot 302A, 302B. The MAC may include up to 64 spread-spectrum code channels, which are orthogonally covered by 64-ary Walsh codes. The MAC channels may be used for CDMA overhead such as power control, data rate control, and the like. Data may be sent in the remaining portions 308A, 308B of the first half-time-slot 302A and the remaining portions 308C, 308D of the second half-time-slot 302B.

In one embodiment of a hybrid telecommunications system, four OFDM symbols may be punctured into the data portion of a time-slot 302. This results in a zeroth OFDM symbol 308A at the beginning of the first half-time-slot 302A, a first OFDM symbol 308B at the end of the first half-time-slot 302A, a second OFDM 308C symbol at the beginning of the second half-time-slot 302B, and a third OFDM symbol at the end of the second half-time-slot 302B. In this example, each OFDM symbol is 400 chips. A cyclic prefix 310 occupies 80 chips, leaving 320 chips to transmit data and pilot tones. The 320 chips translates into 320 equally spaced orthogonal tones across the frequency band. Because the tones at the edges of the frequency band may be affected by Adjacent Channel Interference (ACI), the skilled artisan may chose not to send any data on those tones. Instead, the edges of the frequency band, referred to as "guard-bands," may be used to transmit "pilot tones" and "guard tones." The tones that are not affected by ACI are typically used to transmit modulation symbols with interspersed pilot tones. Both the guard tones and pilot tones are modulated with known data. Depending on the application, the guard tones and the pilot tones may be the same or different.

Figure 4:
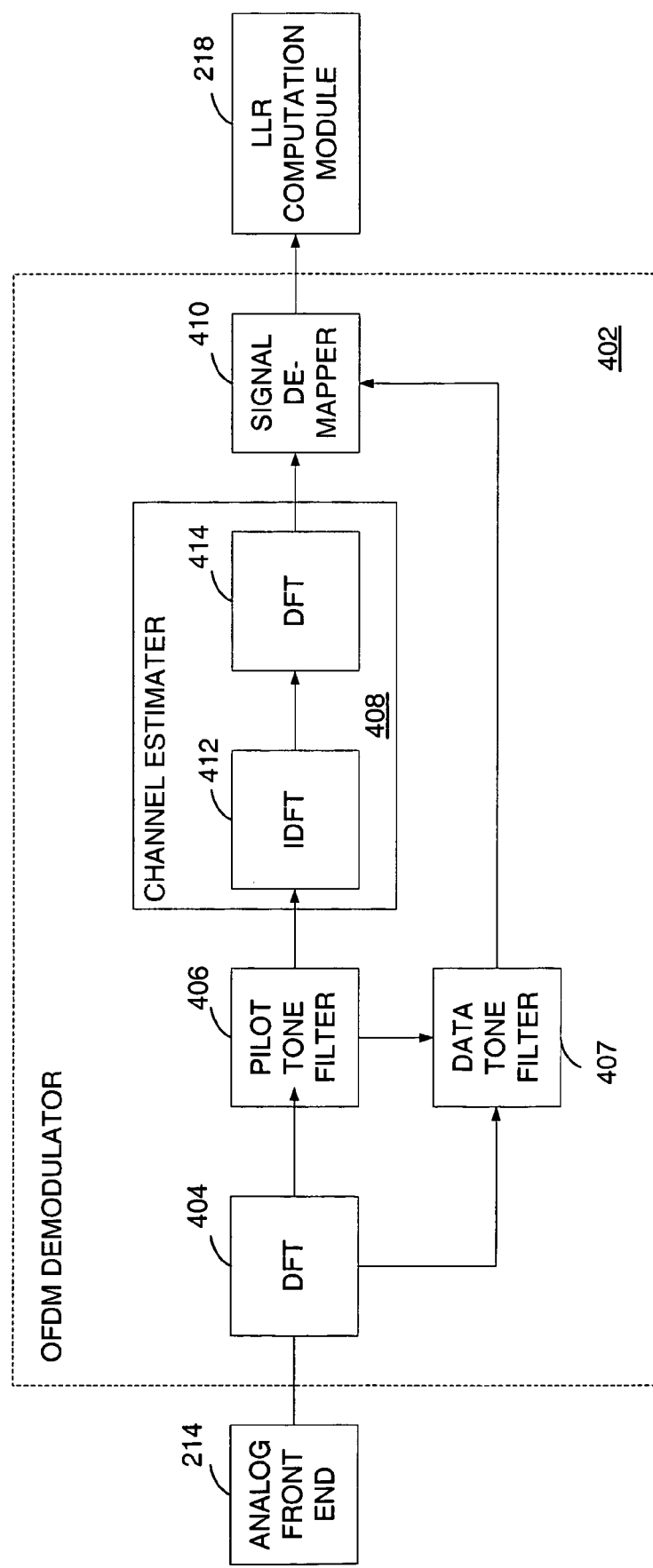
FIG. 4 is a conceptual block diagram illustrating the functionality of an OFDM demodulator in a receiver for a hybrid multi-access telecommunications system.

FIG. 4 is a conceptual block diagram illustrating the functionality of an OFDM demodulator in a receiver for a hybrid multi-access telecommunications system. The OFDM demodulator 402 may be integrated into any processing entity, or distributed among any number of processing entities, within the receiver. The processing entity (or entities) may include a microprocessor, Digital Signal Processor (DSP), or any other hardware and/or software based processing entity (or entities). Alternatively, the OFDM demodulator 402 may be a separate processing entity such as a microprocessor, DSP, programmable logic, dedicated hardware, or any other entity capable of processing information.

The OFDM demodulator 402 may include a Discrete Fourier Transform (DFT) 404, which may be used to process OFDM symbols. The DFT 402 may be used to convert an OFDM symbol from the time domain to the frequency domain. The output of the DFT 404 may be provided to a pilot tone filter 406 in a serial fashion. The pilot tone filter 406 may be implemented as a decimator to select the pilot tones. The decimator may also be configured to select all guard tones. Signaling from the pilot tone filter 406 to a data tone filter 407 may be used to indicate when the data tone filter 407 should pass data from the DFT 404 to a signal demapper 410. The signal demapper 410 makes a soft decision as to the modulation symbol in the signal constellation most likely transmitted on the data tone. This decision is based on received data and an estimate of the channel's frequency response provided by a channel estimator 408. The channel estimator 408 may estimate the channel's frequency response from the pilot tones using a least-squares channel estimation procedure, or any other suitable procedure.

The channel estimator 408 may be implemented with an Inverse Discrete Fourier Transform (IDFT) 412. The IDFT 412 converts the pilot tones from the frequency domain into the estimate of the channel impulse response of length P samples in the time domain, where P is the number of pilot tones in the OFDM symbol. The channel's frequency response may then be estimated for all tones from the estimate of the channel impulse response using an interpolation process implemented by a DFI 414. The number of samples used by the DFT 414 to compute the channel estimate may be reduced if the actual channel's impulse response is less than PT, where 1/T is equal to the chip rate of the OFDM symbol. In this case, the channel's frequency response may be estimated from L samples, where LT is equal to the time duration of the channel's impulse response. The term L is generally referred to as the "delay spread" of the channel impulse response.

The channel estimate may be improved by time-averaging the channel estimates for all OFDM symbols in any given time-slot. In the example discussed in FIG. 3, four channel estimates from four ODFM symbols may be time-averaged. Ideally, a non-causal symmetric filter should be used to time-average the channel estimates for the four ODFM symbols. By way of example, the channel estimate for the first OFDM symbol 308B may be computed by averaging the channel estimates for the zeroth, first, and second OFDM symbols 308A, 308B, 308C. Similarly, the channel estimate for the second OFDM symbol 308C may be computed by averaging the first, second, and third OFDM symbols 308B, 308C, 308D. This approach minimizes the channel estimation bias caused by channel variation induced by Doppler. However, for the zeroth and third OFDM symbols 308A, 308D, this is not possible because adjacent time-slots may contain CDMA signals. Hence, a non-causal filter cannot be applied to the zeroth and third OFDM symbols 308A, 308D. Instead, the channel estimate for the zeroth OFDM symbol 308A may be computed by a weighted averaging process between the zeroth and first OFDM symbols 308A, 308B, and the channel estimate for the third OFDM symbol 308D may be computed by a weighted averaging process between the second and third OFDM symbols 308C, 308D. Alternatively, the channel estimate for the zeroth OFDM symbol 308A may be computed by a weighted averaging process between the zeroth, first, and second OFDM symbols 308A, 308B, 308C, and the channel estimate for the third OFDM symbol 308D in the time-slot may be computed by a weighted averaging process between the first, second and third OFDM symbols 308B, 308C, 308D. The latter approach, however, may cause significant channel estimation bias at high mobile speeds. Either way, the channel estimates for the first and second OFDM symbols 308B, 308C in the time-slot should be more accurate than the channel estimates for the zeroth and third OFDM symbols 308a, 308d in the same time-slot.

In multiple antenna applications employing diversity combining techniques, a sequence of soft decisions may be generated for each antenna. The soft decisions for any given tone (k) may be combined using a Maximum Ratio Combining (MRC) technique before being provided to the LLR computation module. The MRC technique scales each soft decision for a given tone by $1/\sigma_{eff,k}^{(m)2}$ for the $m^{th}$ antenna, where the effective noise variance ($\sigma_{eff,k}^{(m)2}$) is defined by the following equation:

$$\sigma_{eff,k}^{(m)2} = \sigma_{\Delta,k}^{(m)2} + \sigma_k^{(m)2} \qquad (1)$$

where: $\sigma_{\Delta,k}^{(m)2}$ is the Mean-Square Error (MSE) of the channel estimate for the k-th tone received by the $m^{th}$ antenna; and $\sigma_k^{(m)2}$ is the noise variance of the $k^{th}$ tone received by the $m^{th}$ antenna.

Figure 5:
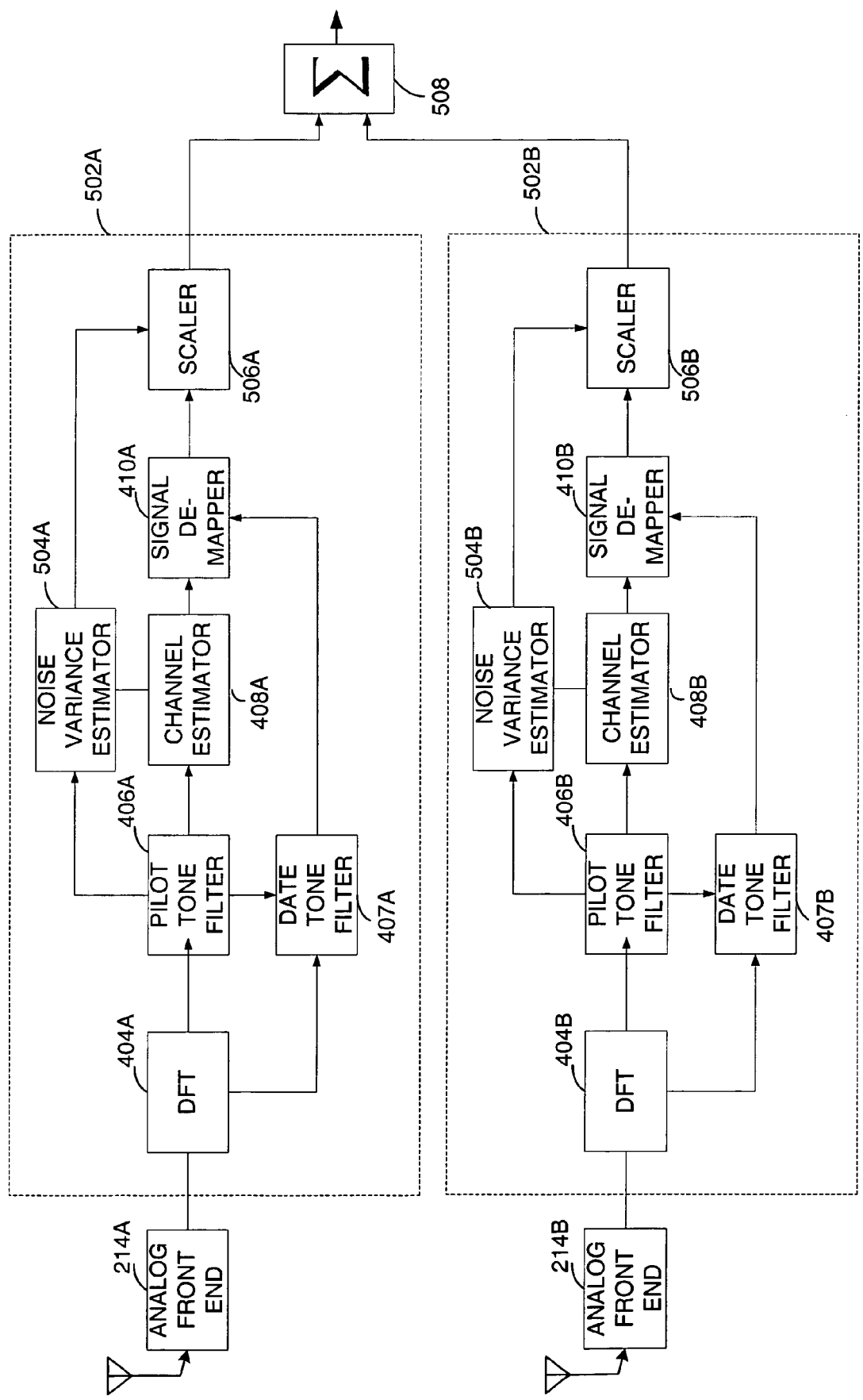
FIG. 5 is a conceptual block diagram illustrating the functionality of an OFDM demodulator in a dual antenna receiver for a hybrid multi-access telecommunications system.

FIG. 5 is a conceptual block diagram illustrating the functionality of an OFDM demodulator in a dual antenna receiver for a hybrid multi-access telecommunications system. The OFDM demodulator 502 may be implemented in a stand-alone processing entity, distributed among multiple processing entities, or integrated into another receiver entity in the same manner as the OFDM modulator described in connection with FIG. 4. The OFDM demodulator 502 is shown with two demodulating channels 502A, 502B, one for each antenna, but may be implemented with any number of demodulating channels depending on the number of antennas in the receiver. In this example, a noise variance estimator 504A, 504B in each demodulating channel 502A, 502B, respectively, estimates the effective noise variance $\sigma_{eff,k}^{(m)2}$ for each tone. The soft decisions generated by each signal demapper 410A, 410B are provided to a scaler 506A, 506B, where they are scaled by $1/\sigma_{eff,k}^{(m)2}$ before being combined with other scaled soft decisions by an adder 508.

Figure 6:
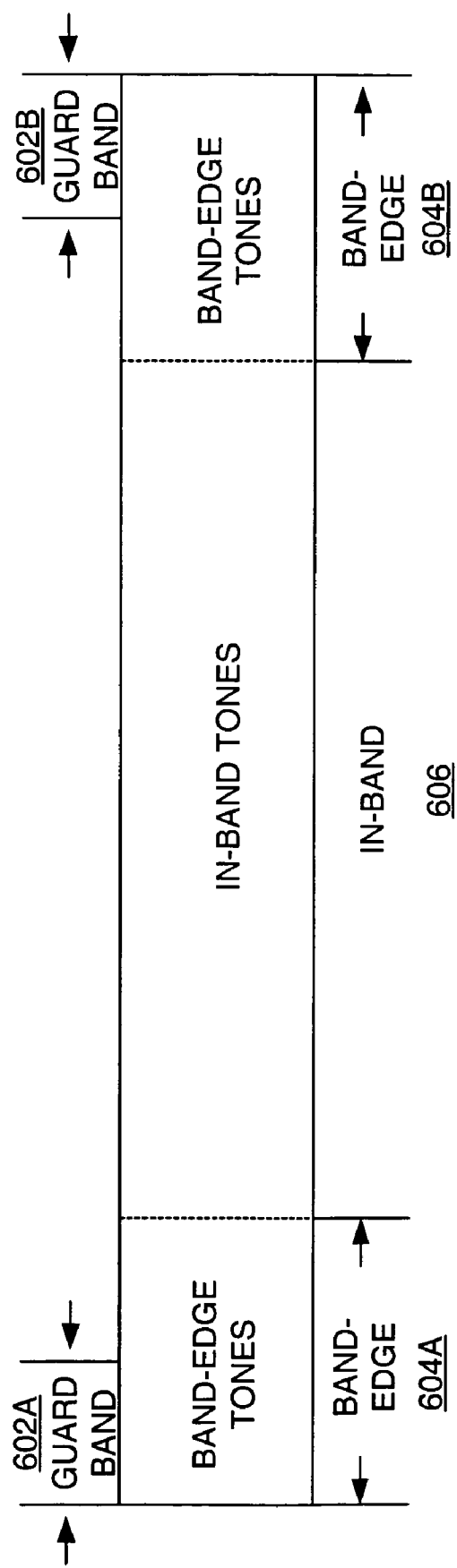
FIG. 6 is a graphical illustration of an OFDM symbol in the frequency domain.

FIG. 6 is a graphical illustration of an OFDM symbol in the frequency domain. As discussed earlier in connection with FIG. 3, each OFDM symbol may include guard-bands 602A, 602B containing only pilot and guard tones. The tones not affected by ACI are typically used to transmit modulation symbols with interspersed pilot tones; however, a tone not affected by ACI, may still have a channel estimate which is affected by ACI. This is because the channel estimate is computed from the interpolation of multiple pilot tones, and in some cases those pilot tones may extend into the guard-band regions. Those tones outside the guard-band regions whose channel estimate are affected by ACI, as well as the tones in the guard-band regions, will be referred to as "band-edge tones." These tones can be found in the band-edge regions 604A, 604B of the frequency band for the OFDM symbol. The remaining tones, with channel estimates that are not affected by ACI, will be referred to as "in-band tones," and may be found in the in-band region 606 of the OFDM symbol.

Figure 7:
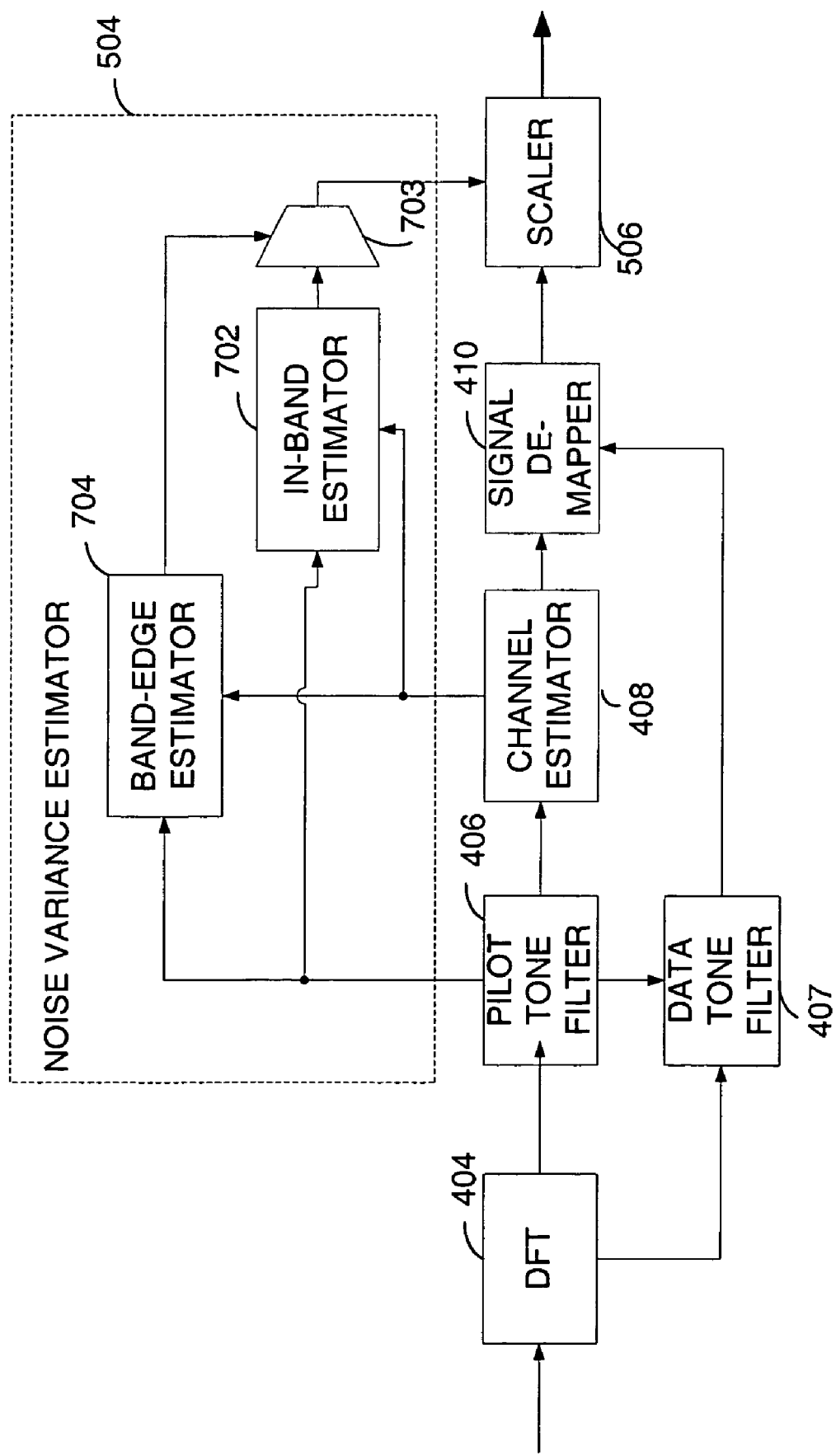
FIG. 7 is a conceptual block diagram illustrating the functionality of a channel estimator capable of computing the effective noise variance for its respective antenna.

FIG. 7 is a conceptual block diagram illustrating the functionality of a channel estimator capable of computing the effective noise variance for its respective antenna. A noise variance estimator 504 may be used to perform this computation. The noise variance estimator 504 may be implemented as part of the channel estimator 408, may be a stand-alone entity, may be implemented as part of another processing entity within the receiver, or may have its functionality distributed among any number of processing entities in the receiver.

The noise variance estimator 504 may include an in-band estimator 702 configured to compute the effective noise variance for the in-band tones, and a band-edge estimator 704 configured to compute the effective noise variance for the band-edge tones. The output at 702 and the output of 704 are provided to a multiplexer (MUX) 703 or a switch. The output of the MUX 703 is then provided to scaler 506. The effective noise variance for in-band tones may be computed from the in-band pilot tones and the channel estimates for the in-band pilot tones. The effective noise variance for the band-edge tones may be computed from the band-edge pilot tones and the channel estimates for the band-edge pilot tones. The accuracy of the effective noise variance for the band-edge tones may be improved by also using the guard-band tones.

Figure 8:
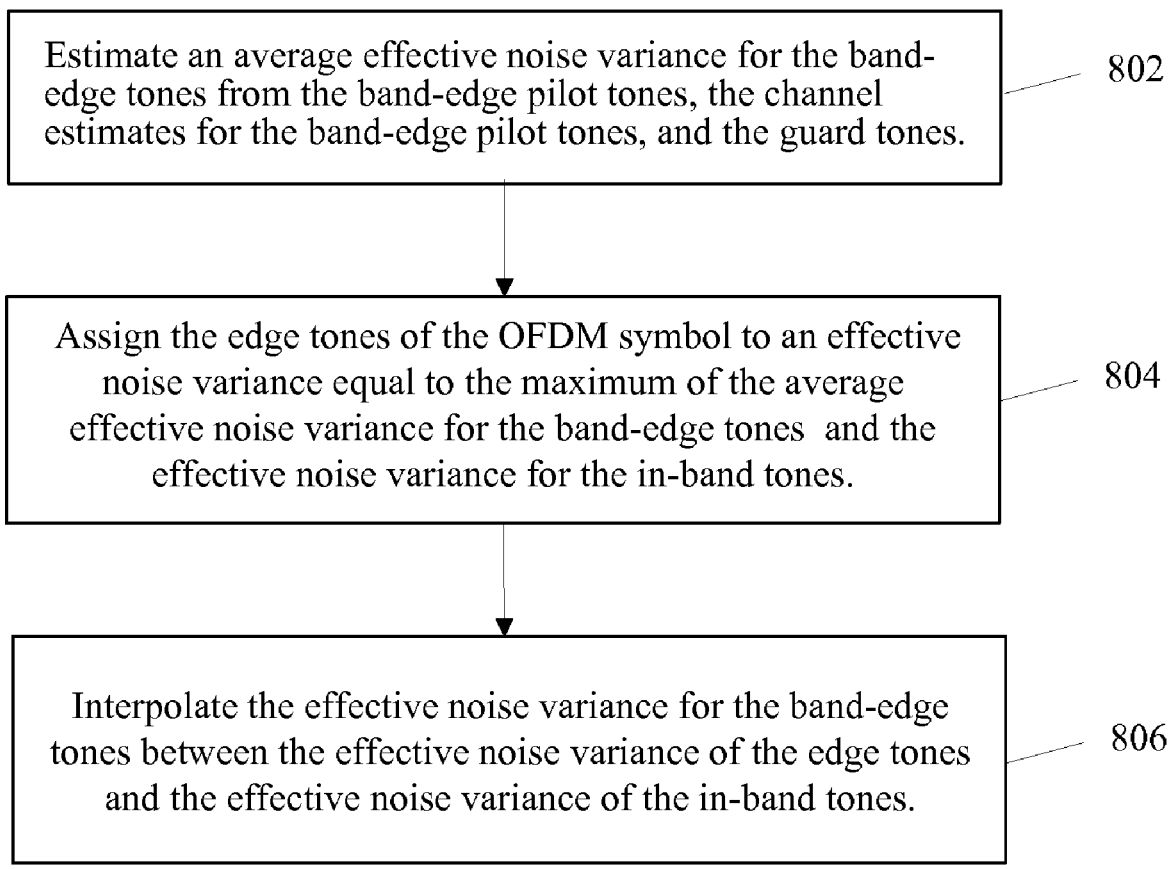
FIG. 8 is a flow diagram illustrating a method of estimating an effective noise variance for the band-edge tones.

FIG. 8 is a flow diagram illustrating a method of estimating an effective noise variance for the band-edge tones according to one example. An average effective noise variance is estimated for the band-edge tones from the band-edge pilot tones, the channel estimates for the band-edge pilot tones, and the guard tones 802. The edge tones of the OFDM symbol are assigned to an effective noise variance equal to the maximum of the average effective noise variance for the band-edge tones and the effective noise variance for the in-band tones 804. The effective noise variance for the band-edge tones are interpolated between the effective noise variance of the edge tones and the effective noise variance of the in-band tones 806.

The operation of the in-band estimator will first be discussed. The in-band tones are the tones for which the MSE of the channel estimates are related to the noise variance of the tones by the following equation:

$$\sigma_\Delta^{(m)2}(n) \approx \frac{L}{P} \sum_{l=0}^{3} |c_{n,l}|^2 \sigma^{(m)2} \quad (2)$$

where $c_{n,l}$ is the time-averaging weights for the channel estimate of the $n^{th}$ OFDM symbol, and $\sigma^{(m)2}$ is the noise variance of the tones received by the $m^{th}$ antenna, which are not affected by ACI. The tone index, or the subscript k, may be suppressed because the noise variance can be assumed to be the same for all the in-band tones.

Thus, the effective noise variance is related to the noise variance by the following equation:

$$\sigma_{eff,}^{(m)2}(n) = \left(1 + \frac{L}{P} \sum_{l=0}^{3} |c_{n,l}|^2\right) \sigma^{(m)2} \quad (3)$$

The noise variance $\sigma^{(m)2}$ may be computed and scaled using equation (3) to generate the effective noise variance $\sigma_{eff,}^{(m)2}(n)$.

A set of in-band pilot tones may be defined as $\Lambda = \{k; -(P-G)/2 \leq k \leq (P-G)/2\}$, where $G>0$ is such that the MSE of the time-averaged channel estimates for the k-th pilot tone can be represented by the following equation:

$$\sigma_{\Delta,k\delta}^{(m)2}(n) \approx \frac{L}{P} \sum_{l=0}^{3} |c_{n,l}|^2 \sigma^{(m)2}, \text{ for } k \in \Lambda \text{ and } n = 0, 1, 2, 3 \quad (4)$$

where $\delta = N/P$ is the pilot tone spacing, N is the number of orthogonal tones, P is the number of pilot tones, and (G-1) is the number of pilot tones whose channel estimates are affected by ACI.

There are four sets of time-averaging weights for the channel estimation; $(c_{0,0}, c_{0,1}, c_{0,2}, c_{0,3})$ for the zeroth OFDM symbol, $(c_{1,0}, c_{1,1}, c_{1,2}, c_{1,3})$ for the first OFDM symbol, $(c_{2,0}, c_{2,1}, c_{2,2}, c_{2,3})$ for the second OFDM symbol, and $(c_{3,0}, c_{3,1}, c_{3,2}, c_{3,3})$ for the third OFDM symbol. The estimator for the in-band effective noise variance for the $n^{th}$ OFDM symbol is given by:

$$\hat{\sigma}_{eff}^{(m)2}(n) = \left(1 + \frac{L}{P} \sum_{j} |c_{n,j}|^2\right) \sum_{l=0}^{3} w_l f_l^{(m)} \quad (5)$$

$$f_l^{(m)} = \sum_{k \in \Lambda} |Y_{k,l}^{(m)} - \hat{H}_{k,l}^{(m)}|^2$$

where: $w_l$ are the combining weights such that the mean of $$\sum_{l=0}^{3} w_l f_l^{(m)}$$

is $\sigma^{(m)2}$; $Y_{k,l}^{(m)}$ is the pilot observation corresponding to the $k^{th}$ pilot tone of the $l^{th}$ OFDM symbol; and
$\hat{H}_{k,l}^{(m)}$ is the channel estimate for the $k^{th}$ pilot tone of the ith OFDM symbol.

An example will be illustrative. In this example, the noise variance estimator will use only the first and second OFDM symbols to estimate the noise variance, which can be represented as follows:

$$w_0 = w_3 = 0, \quad (6)$$

and $$w_l = \frac{1}{2(P-G+1)} \frac{1}{1 - \frac{2L}{P} c_{l,l} + \frac{L}{P} \sum_j |c_{l,j}|^2}, \text{ for } l = 1, 2$$

It can be shown that the mean of $|Y_{k,l}^{(m)} - \hat{H}_{k,l}^{(m)}|^2$ is $$\left(1 - \frac{2L}{P} c_{l,j} + \frac{L}{P} \sum_j |c_{l,j}|^2\right) \sigma^{(m)2}.$$

Thus, the mean of $f_l^{(m)}$ is $$(P - G + 1)\left(1 - \frac{2L}{P} c_{l,l} + \frac{L}{P} \sum_j |c_{l,j}|^2\right) \sigma^{(m)2}$$

because there are P-G+1 in-band pilot tones per OFDM symbol, and using the weights $w_l$, the mean of $w_l f_l^{(m)}$ becomes $\frac{1}{2} \sigma^{(m)2}$.

In the example algorithm, only the first and second OFDM symbols are used for the channel estimates. Thus, the mean of the effective noise variance may be represented as follows:

$$\left(1 + \frac{L}{P}\sum_j |c_{n,j}|^2\right)\left(\frac{1}{2}\sigma^{(m)2} + \frac{1}{2}\sigma^{(m)2}\right) = \left(1 + \frac{L}{P}\sum_j |c_{n,j}|^2\right)\sigma^{(m)2} \quad (7)$$

The weights were designed for the case when the first and second OFDM symbols use the same non-causal symmetric time-averaging weights, i.e. $(c_{1,0}, c_{1,1}, c_{1,2}, c_{1,3})=(\frac{1}{3}, \frac{1}{3}, \frac{1}{3}, 0)$, and $(c_{2,0}, c_{2,1}, c_{2,2}, c_{2,3})=(0, \frac{1}{3}, \frac{1}{3}, \frac{1}{3})$. However, the zeroth and third symbols use different time-averaging filters, e.g., $(c_{0,0}, c_{0,1}, c_{0,2}, c_{0,3})=(\frac{2}{3}, \frac{1}{3}, 0, 0)$, and $(c_{3,0}, c_{3,1}, c_{3,2}, c_{3,3})=(0, 0, \frac{1}{3}, \frac{2}{3})$. In this case, the time-averaged channel estimates for the zeroth and third OFDM symbols may have large bias due to the time-variation of the channel at high mobile speed. As a result, the condition $$\sigma_\Delta^{(m)2}(n) \approx \frac{L}{P}\sum_{l=0}^{3}|c_{n,l}|^2\sigma^{(m)2}$$

may no longer be satisfied. Hence, the channel estimates for only first and second OFDM symbols are used in this example.

Alternatively, the channel estimate may be based on only one OFDM symbol. In this case, the effective noise variance can be estimated as follows:

$$\hat{\sigma}_{eff}^{(m)2}(n) = \left(1 + \frac{L}{P}\sum_j |c_{n,j}|^2\right)w_{n,1}f_1^{(m)} \text{ with} \quad (8)$$

$$w_{n,1} = \frac{1}{(P-G+1)} \frac{1}{1 - \frac{2L}{P}c_{1,1} + \frac{L}{P}\sum_j |c_{1,j}|^2}. \quad (9)$$

The mean of the effective noise variance is the same as before. However, the variance is larger than that using two OFDM symbols. In other words, the former is less accurate than the latter.

The accuracy of the effective noise variance may be improved by using the zeroth and third OFDM symbols, but the channel estimates $\hat{H}_{k,0}^{(m)}$ and $\hat{H}_{k,3}^{(m)}$ used in $f_0^m$ and $f_3^{(m)}$ are without time-averaging, i.e. $(c_{0,0}, c_{0,1}, c_{0,2}, c_{0,3})=(1,0,0,0)$, and $(c_{3,0}, c_{3,1}, c_{3,2}, c_{3,3})$ $(c_{3,0}, c_{3,1}, c_{3,2}, c_{3,3})=(0,0,0,1)$. In this case, the weights may be represented as follows:

$$w_l = \frac{1}{(P-G+1)}\frac{1}{2\left(1-\frac{L}{P}\right)+\sum_{l=1}^{2}\left(1-\frac{2L}{P}c_{l,l}+\frac{L}{P}\sum_j|c_{l,j}|^2\right)},$$

for $l=0,1,2,3$. (10)

In sum, the in-band estimator may be used to compute $f_l^{(m)}$, or the sum of $|Y_{k,l}^{(m)} - \hat{H}_{k,l}^{(m)}|^2$ of in-band tones, to get an estimate of $$(P-G+1)\left(1 - \frac{2L}{P}c_{l,l} + \frac{L}{P}\sum_j|c_{l,j}|^2\right)\sigma^{(m)2},$$

which is proportional to the noise variance $\sigma^{(m)2}$ of the in-band tones. Combining weights may then be chosen so that the mean of the result is the same as $\sigma_{eff}^{(m)2}(n)$ for each OFDM symbol (n=0, 1, 2, 3), i.e., $E[\hat{\sigma}_{eff}^{(m)2}(n)]=\sigma_{eff}^{(m)2}n$. (E[X] denotes expectation or mean of random variable X.) Because different time-averaging weights $c_{n,l}$ for each OFDM symbol, $$\left(1 + \frac{L}{P}\sum_{l=0}^{3}|c_{n,l}|^2\right)$$

may also be different for each symbol. This may cause the different tones in different OFDM symbols in the same time-slot to have different effective noise variances. This should be compensated for in the LLR calculation by the term $$\left(1 + \frac{L}{P}\sum_{l=0}^{3}|c_{n,l}|^2\right).$$

The band-edge estimator will now be discussed. As discussed earlier, in-band tones and the band-edge tones may be determined by comparing the MSE of the channel estimate for the k-th tone $\sigma_{\Delta,}^{(m)2}(n)$ with $$\frac{L}{P}\sum_{l=0}^{3}|c_{n,l}|^2\sigma^{(m)2},$$

where $\sigma^{(m)2}$ is the noise variance of the tones which are not affected by ACI. If they are close to each other, the tones are classified as in-band tones. Otherwise, they are classified as band-edge tones. Given the delay spread L, the number of pilot tones P, and the characteristics of the ACI, such as the adjacent carrier spacing and its power relative to $\sigma^{(m)2}$, the relation between the MSE of the channel estimate for the k-th tone $\sigma_{\Delta,k}^{(m)2}(n)$ and the noise variance $\sigma^{(m)2}$ may be determined either through mathematical analysis or simulations. This may be done in the system design phase, before the noise variance estimator is integrated into the receiver of an AT, and then stored in memory.

A set of band-edge pilot tones may be represented as $\overline{\Lambda}=\{k; (P-G)/2 \leq k \leq P/2-1, \text{ or } -P/2 \leq k \leq (P-G)/2-1)\}$, where G−1 is the number of band-edge pilot tones and k is the pilot tone index. This set may be determined in the system design phase, and stored in memory.

An example will be illustrative. In this example, N=320. So the tone index k goes from −160 to 159, (i.e., k=−160, −159, −158, . . . −1, 0, 1 . . . 158, 159). There are 64 pilot tones (i.e., P=64), and 15 band-edge pilot tones (i.e., G=16). The pilot tones are spaced apart by five frequency tones (i.e., tone indices: k=−160, −155, . . . −5, 0, 5, . . . 150, 155.). Based on these conditions, the in-band tones may be represented by −120≤k≤120, the in-band pilot tones may be represented by the pilot tone indices −24≤k≤24, the band-edge tones may be represented by tone indices 121≦k≦159 and −160≦k≦−121, the band-edge pilot tones may be represented by the pilot tone indices 25≦k≦31 and −32≦k≦−25, and the guard-band tones may be represented by tone indices 150≦k≦159 and −160≦k≦−151. But the pilot tones are punctured in the guard tones, and as a result, the tones at k=−160, −155, 150, 155 are pilot tones. Accordingly, there are K=20−4=16 guard tones. There are 241 in-band tones and 79 band-edge tones. So the majority of the tones are in-band tones. This example also shows the data sent on some band-edge tones.

The noise variance of a band-edge tone is the sum of the noise variance of the in-band tones and the variance of the ACI for the band-edge tones. The MSE of the channel estimate for a band-edge tone is the sum of the MSE of the channel estimate for the in-band tones and the component due to ACI. In general, the amount of the adjacent channel interference in each band-edge tone is different from tone to tone. Hence, it is difficult to accurately estimate the effective noise variances for band-edge tones. However, accounting for the fact that there is ACI in the noise variance estimates, it is possible to improve performance. This is achieved by de-emphasizing the LLR's computed from the tones affected by ACI.

The noise variance estimator may be designed such that, in the absence of ACI, the following equation is satisfied:

$$E\{\hat{\sigma}_{eff,k}^{(m)2}(n)\} = \left(1 + \frac{L}{P}\sum_{l=0}^{3}|c_{n,l}|^2\right)\sigma^{(m)2}. \quad (11)$$

In other words, if there is no ACI, the mean of the noise variance estimator should be the same as the effective noise variance.

The noise variance estimator may be used to account for the increase in the effective noise variance due to the ACI. This may be achieved by using the band-edge tones and guard tones to estimate the effective noise variance. The mean of the estimate will not be the same as the effective noise variance. However, it will be larger than the in-band noise variance estimate. Hence, the band-edge tones will be de-emphasized in LLR computation.

The following band-edge estimator algorithm may be used. The algorithm may be used to compute the average of the variances of the band-edge tones as follows:

$$\bar{\sigma}_{aci}^{(m)2}(n) = \left(1 + \frac{L}{P}\sum_{j}|c_{n,j}|^2\right)\left(\sum_{l=0}^{3}\lambda_l g_l^{(m)} + \sum_{l=0}^{3}\mu_l q_l^{(m)}\right) \quad (12)$$

$$g_l^{(m)} = \sum_{k\in\overline{\Lambda}}|Y_{k,l}^{(m)} - \hat{H}_{k,l}^{(m)}|^2$$

$$q_l^{(m)} = \sum_{k\in\Omega}|X_{k,l}^{(m)}|^2$$

where: $\Omega$ is a set of tone indices for the guard tones;
$X_{k,l}^{(m)}$ is the k-th tone for the l-th OFDM symbol;
$Y_{k,l}^{(m)} = X_{k\delta,l}^{(m)}$, where $\delta = N/P$ is a pilot tone spacing. By way of example, the first pilot tone is the fifth tone of the OFDM symbol, so $Y_{1,l}^{(m)} = X_{5,l}^{(m)}$;
$\lambda_l$ and $\mu_l$ are the combining weights.

K is the number of elements in the set $\Omega$, i.e., the number of guard tones within an OFDM symbol. If there are sixteen guard tones, by way of example, K is 16. $\lambda_l$ and $\mu_l$ are chosen in the system design phase so that in the absence of ACI, the following relationship exists:

$$\sigma^{(m)2} = E\left\{\sum_{l=0}^{3}\lambda_l g_l^{(m)} + \sum_{l=0}^{3}\mu_l q_l^{(m)}\right\} \quad (13)$$

where E[X] denotes expectation or mean of a random variable X. In the absence of ACI, this condition makes the mean of $\bar{\sigma}_{aci}^{(m)2}(n)$ the same as the effective noise variance. In the presence of ACI, this $\bar{\sigma}_{aci}^{(m)2}(n)$ may be used as an estimate of the effective noise variance for the "edge tones" (i.e., k=((N/2)−1) and k=−(N/2)). Note that the edge tone at k=((N/2)−1) is the rightmost tone in the positive frequency, and the edge tone at k=−(N/2) is the leftmost tone in the negative frequency.

In the absence of ACI, the effective noise variance of the band-edge should be the same as the in-band effective noise variance. But in the presence of ACI, the band-edge effective noise variance will be larger than the in-band effective noise variance. Since the noise variance estimates are noisy, it may be possible that $\bar{\sigma}_{aci}^{(m)2}(n) < \hat{\sigma}_{eff}^{(m)2}(n)$, which is not correct. Thus, the term $\bar{\sigma}_{aci}^{(m)2}(n)$ can be refined as follows. The maximum of $\bar{\sigma}_{aci}^{(m)2}(n)$ and the estimate for the in-band tones are taken to be the variances for the edge tones:

$$\hat{\sigma}_{eff,N/2-1}^{(m)2}(n) = \hat{\sigma}_{eff,-N/2}^{(m)2}(n) = \max\{\bar{\sigma}_{aci}^{(m)2}(n), \hat{\sigma}_{eff}^{(m)2}(n)\} \quad (14)$$

where $\hat{\sigma}_{eff}^{(m)2}(n)$ is the estimate of the in-band effective noise variance for the $n^{th}$ OFDM symbol.

Next, the effective noise variance for the other band-edge tones, $\hat{\sigma}_{eff,k}^{(m)2}(n)$ are interpolated between in-band variance $\hat{\sigma}_{eff}^{(m)2}(n)$ and $\hat{\sigma}_{eff,N/2}^{(m)2}(n)$.

In the absence of ACI, the mean of $|Y_{k,l}^{(m)} - \hat{H}_{k,l}^{(m)}|^2$ is $$\left(1 - \frac{2L}{P}c_{l,l} + \frac{L}{P}\sum_{j}|c_{l,j}|^2\right)\sigma^{(m)2}.$$

Thus, the mean of $f_l^{(m)}$ is $$(G-1)\left(1 - \frac{2L}{P}c_{l,l} + \frac{L}{P}\sum_{j}|c_{l,j}|^2\right)\sigma^{(m)2},$$

since there are (G−1) elements in the sum. The mean of $|X_{k,l}^{(m)}|^2$ is $\sigma^{(m)2}$, since there is no signal in the guard tones. Accordingly, the mean of $q_l^{(m)}$ is given by the following equation:

$$E\{q_l^{(m)}\} = E\left\{\sum_{k\in\Omega}|X_{k,l}^{(m)}|^2\right\} = K\sigma^{(m)2}; \quad (15)$$

where K is the number of guard tones. Thus, by properly choosing $\lambda_l$ and $\mu_l$, one can make the mean of $$\sum_{l=0}^{3} \lambda_l g_l^{(m)} + \sum_{l=0}^{3} \mu_l q_l^{(m)}$$

the same as $\sigma^{(m)2}$.

In the presence of ACI, $g_l^{(m)}$ and $q_l^{(m)}$ will contain the ACI contributions. So the $\bar\sigma_{aci}^{(m)2}(n)$ becomes larger than $\sigma^{(m)2}$ to account for the increased effective noise variance. This is used in LLR computation to de-emphasize the LLRs from the band-edge tones.

Another example may be illustrative.

$$\lambda_0 = \lambda_3 = 0, \quad (16)$$
$$\lambda_l = \frac{1}{2(G+K-1)} \frac{1}{1 - \frac{2L}{P}c_{l,l} + \frac{L}{P}\sum_j |c_{l,j}|^2}, \text{ for } l = 1, 2$$

$$\mu_0 = \mu_3 = 0, \text{ and} \quad (17)$$
$$\mu_l = \frac{1}{2(G+K-1)}, \text{ for } l = 1, 2,$$

where K is the number of guard-band tones within an OFDM symbol, i.e. the number of elements in the set $\Omega$, and G−1 is the number of band-edge pilot tones.

If only guard tones are used:

$$\lambda_0 = \lambda_1 = \lambda_2 = \lambda_3 = 0, \quad (18)$$
and
$$\mu_0 = \mu_1 = \mu_2 = \mu_3 = \frac{1}{4K} \quad (19)$$

In the various embodiments of the receiver, methods for computing the effective noise variances of OFDM symbols are described for multiple antenna applications using diversity techniques. However, the method described throughout this disclosure for computing noise variances of OFDM symbols may have many applications. By way of example, the noise variances of OFDM symbols may be useful for SNR estimations, LLR computations, and other processing functions. In multiple antenna applications, noise variance computations may be used to determine which antenna is more reliable. It can also be used to de-emphasize the less reliable data and emphasize the more reliable data received in OFDM symbols when computing LLRs. Those skilled in the art will readily appreciate that there may be numerous applications in which noise variance information may be useful.

The various illustrative logical blocks, modules, circuits, elements, and/or components described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, Read only Memory (ROM), Electrically Programmable ROM (EPROM) memory, Electrically Erasable Programmable ROM (EEPROM) memory, registers, hard disk, a removable disk, a Compact Disc ROM (CD-ROM,) or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of estimating noise variance, comprising:
   receiving a signal including an Orthogonal Frequency Division Multiplexing (OFDM) symbol having in-band tones including in-band pilot tones, and band-edge tones including band-edge pilot tones and guard tones;
   estimating an effective noise variance for the in-band tones using the in-band pilot tones and channel estimates for the in-band pilot tones; and
   estimating an effective noise variance for the band-edge tones using the band-edge pilot tones, channel estimates for the band-edge pilot tones, and the guard tones.

2. The method of claim 1, wherein the effective noise variance for the in-band tones is estimated by estimating a noise variance for the in-band tones and, scaling the estimated noise variance by a scaler, the scaler being a function of the delay spread used to estimate the channel and the number of pilot tones in the OFDM symbol.

3. The method of claim 2, wherein the noise variance for the in-band tones is estimated from the in-band pilot tones and the channel estimates for the in-band pilot tones.

4. The method of claim 1, wherein the effective noise variance for the band-edge tones is estimated by:
   estimating an average effective noise variance for the band-edge tones from the band-edge pilot tones, the channel estimates for the band-edge pilot tones, and the guard tones;
   assigning the edge tones of the OFDM symbol to an effective noise variance equal to the maximum of the average effective noise variance for the band-edge tones and the effective noise variance for the in-band tones; and
   interpolating the effective noise variance for the band-edge tones between the effective noise variance of the edge tones and the effective noise variance of the in-band tones.

5. The method of claim 4, wherein the average effective noise variance is estimated by estimating a noise variance for the band-edge tones and scaling the estimated noise variance by a scaler, the scaler being a function of the delay spread used to estimate the channel and the number of pilot tones in the OFDM symbol.

6. The method of claim 5, wherein the noise variance for the band-edge tones is estimated from the band-edge pilot tones, the channel estimates for the band-edge pilot tones, and the guard tones.

7. A method of estimating noise variance, comprising:
receiving a signal including a plurality of Orthogonal Frequency Division Multiplexing (OFDM) symbols each having in-band tones including in-band pilot tones, and band-edge tones including band-edge pilot tones and guard tones;
estimating an effective noise variance for the in-band tones of one of the OFDM symbols by estimating a noise variance for the in-band tones of one or more of the OFDM symbols, weighting the noise variance estimates, combining the weighted noise variance estimates, and scaling the combined weighted noise variance estimates; and
estimating an effective noise variance for the band-edge tones of said one of the OFDM symbols using the band-edge pilot tones for said one of the OFDM symbols, channel estimates for the band-edge pilot tones for said one of the OFDM symbols, and the guard tones for said one of the OFDM symbols.

8. The method of claim 7, wherein the weights applied to the noise variance estimates are such that the mean of the combined weighted noise variance estimates is substantially equal to the noise variance of the in-band tones.

9. The method of claim 7, wherein the noise variance for the in-band tones of said one of the OFDM symbols is estimated from the in-band pilot tones of said one of the OFDM symbols and channel estimates for the in-band pilot tones of said one of the OFDM symbols, the channel estimates for the in-band pilot tones of said one of the OFDM symbols being time averaged over two or more of the OFDM symbols.

10. The method of claim 9, wherein the channel estimates for the in-band pilot tones of said one of the OFDM symbols are time averaged using a non-causal filter.

11. The method of claim 9, wherein the combined weighted noise variance estimates is scaled by a scaler, the scaler being a function of time-averaging weights for said one of the OFDM symbols.

12. The method of claim 11, wherein the scaler is further a function of the delay spread used to estimate the channel and the number of pilot tones in said one of the OFDM symbols.

13. A method of estimating noise variance, comprising:
receiving a signal including a plurality of Orthogonal Frequency Division Multiplexing (OFDM) symbols each having in-band tones including in-band pilot tones, and band-edge tones including band-edge pilot tones and guard tones;
estimating an effective noise variance for the in-band tones of one of the OFDM symbols using the in-band pilot tones for said one of the OFDM symbols and channel estimates for said one of the OFDM symbols, the channel estimates being time averaged over two or more of the OFDM symbols; and
estimating an effective noise variance for the band-edge tones of said one of the OFDM symbols using the band-edge pilot tones for said one of the OFDM symbols, channel estimates for the band-edge pilot tones for said one of the OFDM symbols, and the guard tones for said one of the OFDM symbols.

14. The method of claim 13, wherein the channel estimates are time averaged using a non-causal filter.

15. The method of claim 13, wherein the effective noise variance for the in-band tones of said one of the OFDM symbols is estimated by estimating a noise variance for the in-band tones of one or more of the OFDM symbols, weighting the noise variance estimates, combining the weighted noise variance estimates, and scaling the combined weighted noise variance estimates, the noise variance being estimated from the in-band pilot tones for said one of the OFDM symbols and the channel estimates for the in-band pilot tones of said one of the OFDM symbols.

16. The method of claim 15, wherein the combined weighted noise variance estimates is scaled by a scaler, the scaler being a function of time-averaging weights for said one of the OFDM symbols.

17. The method of claim 16, wherein the scaler is further a function of the delay spread used to estimate the channel and the number of pilot tones in said one of the OFDM symbols.

18. The method of claim 15, wherein the weights applied to the noise variance estimates are such that the mean of the combined weighted noise variance estimates is substantially equal to the actual noise variance.

19. A method of estimating noise variance, comprising:
receiving a signal including a plurality of Orthogonal Frequency Division Multiplexing (OPDM) symbols each having in-band tones including in-band pilot tones, and band-edge tones including band-edge pilot tones and guard tones;
estimating an effective noise variance for the in-band tones of one of the OFDM symbols using the in-band pilot tones for said one of the OFDM symbols and channel estimates for said one of the OFDM symbols; and
estimating an effective noise variance for the band-edge tones of said one of the OFDM symbols by estimating an average effective noise variance for the band-edge tones from the band-edge pilot tones for said one of the OFDM symbols, the channel estimates for the band-edge pilot tones for said one of the OFDM symbols, and the guard tones for said one of the OFDM symbols, assigning the edge tones of the OFDM symbol to an effective noise variance equal to the maximum of the average effective noise variance for the band-edge tones and the effective noise variance for the in-band tones, and interpolating the effective noise variance for the band- edge tones between the effective noise variance of the edge tones and the effective noise variance of the in-band tones.

20. The method of claim 19, wherein the average effective noise variance is estimated by estimating a noise variance for the band-edge tones of one or more of the OFDM symbols, weighting the noise variance estimates, combining the weighted noise variance estimates, and scaling the combined weighted noise variance estimates.

21. The method of claim 20, wherein the average effective noise variance is further estimated by weighting the guard tones of one or more of the OFDM symbols, combining the weighted guard tones, and scaling the combined weighted guard tones.

22. The method of claim 21, wherein the weights applied to the noise variance estimates and the guard tones are such that the mean of the combined weighted noise variance estimates and the combined weighted guard tones is substantially equal to the effective noise variance in the absence of adjacent channel interference.

23. The method of claim 19, wherein the channel estimates are time averaged over two or more of the OFDM symbols.

24. The method of claim 23, wherein the channel estimates are time averaged using a non-causal filter.

25. A demodulator configured to receive a signal including an Orthogonal Frequency Division Multiplexing (OFDM) symbol having in-band tones including in-band pilot tones, and band-edge tones including band-edge pilot tones and guard tones, the demodulator comprising:

a channel estimator configured to generate channel estimates for the in-band pilot tones and channel estimates for the band-edge pilot tones;

an in-band estimator configured to estimate an effective noise variance for the in-band tones using the in-band pilot tones and the channel estimates for the in-band pilot tones; and a band-edge estimator configured to estimate an effective noise variance for the band-edge tones using the band-edge pilot tones, the channel estimates for the band-edge pilot tones, and the guard tones.

26. The demodulator of claim 25, wherein the in-band estimator is configured to estimate the effective noise variance for the in-band tones by estimating a noise variance for the in-band tones and scaling the estimated noise variance by a scaler, the scaler being a function of the delay spread used by the channel estimator to estimate the channel and the number of pilot tones in the OFDM symbol.

27. The demodulator of claim 26, wherein the in-band estimator is configured to estimate the noise variance for the in-band tones from the in-band pilot tones and the channel estimates for the in-band pilot tones.

28. The demodulator of claim 25, wherein the band-edge estimator is configured to estimate the effective noise variance for the band-edge tones by estimating an average effective noise variance for the band-edge tones from the band-edge pilot tones, the channel estimates for the band-edge pilot tones, and the guard tones, assigning the edge tones of the OFDM symbol to an effective noise variance equal to the maximum of the average effective noise variance for the band-edge tones and the effective noise variance for the in-band tones, and interpolating the effective noise variance for the band-edge tones between the effective noise variance of the edge tones and the effective noise variance of the in-band tones.

29. The demodulator of claim 28, wherein the band-edge estimator is configured to estimate the average effective noise variance by estimating a noise variance for the band-edge tones and scaling the estimated noise variance by a scaler, the scaler being a function of the delay spread used by the channel estimator to estimate the channel and the number of pilot tones in the OFDM symbol.

30. The demodulator of claim 29, wherein the band-edge estimator is configured to estimate the noise variance for the band-edge tones from the band-edge pilot tones, the channel estimates for the band-edge pilot tones, and the guard tones.

31. A demodulator configured to receive a signal including a plurality of Orthogonal Frequency Division Multiplexing (OFDM) symbols each having in-band tones including in-band pilot tones, and band-edge tones including band-edge pilot tones and guard tones, the demodulator comprising:

a channel estimator configured to generate channel estimates for the band-edge pilot tones of one of the OFDM symbols;

an in-band estimator configured to estimate an effective noise variance for the in-band tones of said one of the OFDM symbols by estimating a noise variance for the in-band tones of one or more of the OFDM symbols, weighting the noise variance estimates, combining the weighted noise variance estimates, and scaling the combined weighted noise variance estimates; and a band-edge estimator configured to estimate an effective noise variance for the band-edge tones of said one of the OFDM symbols using the band-edge pilot tones for said one of the OFDM symbols, channel estimates for the band-edge pilot tones for said one of the OFDM symbols, and the guard tones for said one of the OFDM symbols.

32. The demodulator of claim 31, wherein the weights applied to the noise variance estimates are such that the mean of the combined weighted noise variance estimates is substantially equal to the actual noise variance of the in-band tones.

33. The demodulator of claim 31, wherein the channel estimator is further configured to generate channel estimates for the in-band pilot tones of said one of the OFDM symbols, the channel estimates for the in-band pilot tones of said one of the OFDM symbols being time averaged over two or more of the OFDM symbols, and wherein the in-band estimator is configured to estimate the noise variance for the in-band tones of said one of the OFDM symbols from the in-band pilot tones of said one of the OFDM symbols and the channel estimates for the in-band pilot tones of said one of the OFDM symbols.

34. The demodulator of claim 33, wherein the channel estimator is further configured to time average the channel estimates for the in-band pilot tones of said one of the OFDM symbols over said two or more of the OFDM symbols using a non-causal filter.

35. The demodulator of claim 33, wherein the in-band estimator is further configured to scale the combined weighted noise variance estimates by a scaler, the scaler being a function of time-averaging weights for said one of the OFDM symbols.

36. The demodulator of claim 35, wherein the scaler is further a function of the delay spread used by the channel estimator to produce the channel estimates for the in-band pilot tones and the number of pilot tones in said one of the OFDM symbol.

37. A demodulator configured to receive a signal including a plurality of Orthogonal Frequency Division Multiplexing (OFDM) symbols each having in-band tones including in-band pilot tones, and band-edge tones including band-edge pilot tones and guard tones, the demodulator comprising:

a channel estimator configured to generate channel estimates for the in-band pilot tones of one of the OFDM symbols and channel estimates for the band-edge pilot tones of said one of the OFDM symbols, the channel estimates for the in-band pilot tones for said one of the OFDM symbols being time averaged over two or more of the OFDM symbols;

an in-band estimator configured to estimate an effective noise variance for the in-band tones of said one of the OFDM symbols using the in-band pilot tones for said one of the OFDM symbols and the channel estimates for said one of the OFDM symbols; and a band-edge estimator configured to estimate an effective noise variance for the band-edge tones of said one of the OFDM symbols using the band-edge pilot tones for said one of the OFDM symbols, the channel estimates for the band-edge pilot tones for said one of the OFDM symbols, and the guard tones for said one of the OFDM symbols.

38. The demodulator of claim 37, wherein the channel estimator is configured to generate channel estimates for the in-band pilot tones of said one of the OFDM symbols over said two or more of the OFDM symbols using a non-causal filter.

39. The demodulator of claim 37, wherein the in-band estimator is further configured to estimate the effective noise variance for the in-band tones of said one of the OFDM symbols by estimating a noise variance for the in-band tones of one or more of the OFDM symbols, weighting the noise variance estimates, combining the weighted noise variance estimates, and scaling the combined weighted noise variance estimates, the noise variance being estimated from the in-band pilot tones for said one of the OFDM symbols and the channel estimates for the in-band pilot tones of said one of the OFDM symbols.

40. The demodulator of claim 39, wherein the in-band estimator is further configured to scale the combined weighted noise variance estimates by a scaler, the scaler being a function of time-averaging weights for said one of the OFDM symbols.

41. The demodulator of claim 40, wherein the scaler is further a function of the delay spread used by the channel estimator to estimate the channel for said one of the OFDM symbols and the number of pilot tones in said one of the OFDM symbols.

42. The demodulator of claim 39, wherein the weights applied to the noise variance estimates are such that the mean of the combined weighted noise variance estimates is substantially equal to the actual noise variance for said one of the OFDM symbols.

43. A demodulator configured to receive a signal including a plurality of Orthogonal Frequency Division Multiplexing (OFDM) symbols each having in-band tones including in-band pilot tones, and band-edge tones including band-edge pilot tones and guard tones, the demodulator comprising:
a channel estimator configured to generate channel estimates for the in-band pilot tones of one of the OFDM symbols and channel estimates for the band-edge pilot tones of said one of the OFDM symbols;
an in-band estimator configured to estimate an effective noise variance for the in-band tones of said one of the OFDM symbols using the in-band pilot tones for said one of the OFDM symbols and channel estimates for said one of the OFDM symbols; and
a band-edge estimator configured to estimate an effective noise variance for the band-edge tones of said one of the OFDM symbols by estimating an average effective noise variance for the band-edge tones for said one of the OFDM symbols from the band-edge pilot tones for said one of the OFDM symbols, the channel estimates for the band-edge pilot tones for said one of the OFDM symbols, and the guard tones for said one of the OFDM symbols, assigning the edge tones of the OFDM symbol to an effective noise variance equal to the maximum of the average effective noise variance for the band-edge tones for said one of the OFDM symbols and the effective noise variance for the in-band tones for said one of the OFDM symbols, and interpolating the effective noise variance for the band-edge tones between the effective noise variance of the edge tones and the effective noise variance of the in-band tones.

44. The demodulator of claim 43, wherein the band-edge estimator is configured to estimate the average effective noise variance by estimating a noise variance for the band-edge tones of one or more of the OFDM symbols, weighting the noise variance estimates, combining the weighted noise variance estimates, and scaling the combined weighted noise variance estimates.

45. The demodulator of claim 44, wherein the band-edge estimator is further configured to estimate the average effective noise variance by weighting the guard tones of one or more of the OFDM symbols, combining the weighted guard tones, and scaling the combined weighted guard tones.

46. The demodulator of claim 45, wherein the weights applied to the noise variance estimates and the guard tones are such that the mean of the sum of the combined weighted noise variance estimates and the combined weighted guard tones is substantially equal to the effective noise variance in the absence of adjacent channel interference.

47. The demodulator of claim 43, wherein the channel estimates generated by the band-edge estimator for the band-edge pilot tones for said one of the OFDM symbols are time averaged over two or more of the OFDM symbols.

48. The demodulator of claim 47, wherein the channel estimates generated by the band-edge estimator for the band-edge pilot tones for said one of the OFDM symbols are time averaged over said two or more of the OFDM symbols using a non-causal filter.

49. A wireless communication apparatus adapted to receive signals from a plurality of antennas, including signals having an Orthogonal Frequency Division Multiplex (OFDM) symbol with in-band pilot tones, band-edge pilot tones, and guard tones, the apparatus comprising:
a channel estimator to generate channel estimates for the in-band pilot tones and band-edge pilot tones;
an in-band channel estimator to estimate an effective noise variance of the in-band tones using the in-band pilot tones and the channel estimates for the in-band pilot tones;
a band-edge estimator to estimate an effective noise variance for the band-edge tones using the band-edge pilot tones and the channel estimates for the band-edge tones; and
a controller for evaluating reliability of the plurality of antennas.

50. The apparatus as in claim 49, wherein the controller is further adapted to determine Likelihood Ratios (LLRs) for the plurality of antennas in response to the estimates of effective noise variance for the in-band tones and the band-edge tones.

51. An apparatus for estimating noise variance, comprising:
means for receiving a signal including an Orthogonal Frequency Division Multiplexing (OFDM) symbol having in-band tones including in-band pilot tones, and band-edge tones including band-edge pilot tones and guard tones;
means for estimating an effective noise variance for the in-band tones using the in-band pilot tones and channel estimates for the in-band pilot tones; and
means for estimating an effective noise variance for the band-edge tones using the band- edge pilot tones, channel estimates for the band-edge pilot tones, and the guard tones.

52. The apparatus of claim 51, wherein the effective noise variance for the in-band tones is estimated by estimating a noise variance for the in-band tones and scaling the estimated noise variance by a means for scaling, the means for scaling being a function of the delay spread used to estimate the channel and the number of pilot tones in the OFDM symbol.

53. The apparatus of claim 52, wherein the noise variance for the in-band tones is estimated from the in-band pilot tones and the channel estimates for the in-band pilot tones.

54. The apparatus of claim 51, wherein the effective noise variance for the band-edge tones is estimated by:

estimating an average effective noise variance for the band-edge tones from the band-edge pilot tones, the channel estimates for the band-edge pilot tones, and the guard tones;

assigning the edge tones of the OFDM symbol to an effective noise variance equal to the maximum of the average effective noise variance for the band-edge tones and the effective noise variance for the in-band tones; and interpolating the effective noise variance for the band-edge tones between the effective noise variance of the edge tones and the effective noise variance of the in-band tones.

55. The apparatus of claim 54, wherein the average effective noise variance is estimated by estimating a noise variance for the band-edge tones and scaling the estimated noise variance by a means for scaling, the means for scaling being a function of the delay spread used to estimate the channel and the number of pilot tones in the OFDM symbol.

56. The apparatus of claim 55, wherein the noise variance for the band-edge tones is estimated from the band-edge pilot tones, the channel estimates for the band- edge pilot tones, and the guard tones.

57. An apparatus for estimating noise variance, comprising:
means for receiving a signal including a plurality of Orthogonal Frequency Division Multiplexing (OFDM) symbols each having in-band tones including in-band pilot tones, and band-edge tones including band-edge pilot tones and guard tones;
means for estimating an effective noise variance for the in-band tones of one of the OFDM symbols by estimating a noise variance for the in-band tones of one or more of the OFDM symbols, weighting the noise variance estimates, combining the weighted noise variance estimates, and scaling the combined weighted noise variance estimates; and
means for estimating an effective noise variance for the band-edge tones of said one of the OFDM symbols using the band-edge pilot tones for said one of the OFDM symbols, channel estimates for the band-edge pilot tones for said one of the OFDM symbols, and the guard tones for said one of the OFDM symbols.

58. The apparatus of claim 57, wherein the weights applied to the noise variance estimates are such that the mean of the combined weighted noise variance estimates is substantially equal to the noise variance of the in-band tones.

59. The apparatus of claim 57, wherein the noise variance for the in-band tones of said one of the OFDM symbols is estimated from the in-band pilot tones of said one of the OFDM symbols and channel estimates for the in-band pilot tones of said one of the OFDM symbols, the channel estimates for the in-band pilot tones of said one of the OFDM symbols being time averaged over two or more of the OFDM symbols.

60. The apparatus of claim 59, wherein the channel estimates for the in-band pilot tones of said one of the OFDM symbols are time averaged using a non-causal filter.

61. The apparatus of claim 59, wherein the combined weighted noise variance estimates is scaled by a means for scaling, the means for scaling being a function of time-averaging weights for said one of the OFDM symbols.

62. The apparatus of claim 61, wherein the means for scaling is further a function of the delay spread used to estimate the channel and the number of pilot tones in said one of the OFDM symbols.

63. An apparatus for estimating noise variance, comprising:
means for receiving a signal including a plurality of Orthogonal Frequency Division Multiplexing (OFDM) symbols each having in-band tones including in-band pilot tones, and band-edge tones including band-edge pilot tones and guard tones;
means for estimating an effective noise variance for the in-band tones of one of the OFDM symbols using the in-band pilot tones for said one of the OFDM symbols and channel estimates for said one of the OFDM symbols, the channel estimates being time averaged over two or more of the OFDM symbols; and
means for estimating an effective noise variance for the band-edge tones of said one of the OFDM symbols using the band-edge pilot tones for said one of the OFDM symbols, channel estimates for the band-edge pilot tones for said one of the OPDM symbols, and the guard tones for said one of the OFDM symbols.

64. The apparatus of claim 63, wherein the channel estimates are time averaged using a non-causal filter.

65. The apparatus of claim 63, wherein the effective noise variance for the in-band tones of said one of the OFDM symbols is estimated by estimating a noise variance for the in-band tones of one or more of the OFDM symbols, weighting the noise variance estimates, combining the weighted noise variance estimates, and scaling the combined weighted noise variance estimates, the noise variance being estimated from the in-band pilot tones for said one of the OFDM symbols and the channel estimates for the in-band pilot tones of said one of the OFDM symbols.

66. The apparatus of claim 65, wherein the combined weighted noise variance estimates is scaled by a means for scaling, the means for scaling being a function of time-averaging weights for said one of the OFDM symbols.

67. The apparatus of claim 66, wherein the means for scaling is further a function of the delay spread used to estimate the channel and the number of pilot tones in said one of the OFDM symbols.

68. The apparatus of claim 65, wherein the weights applied to the noise variance estimates are such that the mean of the combined weighted noise variance estimates is substantially equal to the actual noise variance.

69. An apparatus for estimating noise variance, comprising:
means for receiving a signal including a plurality of Orthogonal Frequency Division Multiplexing (OFDM) symbols each having in-band tones including in-band pilot tones, and band-edge tones including band-edge pilot tones and guard tones;
means for estimating an effective noise variance for the in-band tones of one of the OFDM symbols using the in-band pilot tones for said one of the OFDM symbols and channel estimates for said one of the OFDM symbols; and
means for estimating an effective noise variance for the band-edge tones of said one of the OFOM symbols by estimating an average effective noise variance for the band-edge tones from the band-edge pilot tones for said one of the OFDM symbols, the channel estimates for the band-edge pilot tones for said one of the OFDM symbols, and the guard tones for said one of the OFDM symbols, assigning the edge tones of the OFDM symbol to an effective noise variance equal to the maximum of the average effective noise variance for the band-edge tones and the effective noise variance for the in-band tones, and interpolating the effective noise variance for the band-edge tones between the effective noise variance of the edge tones and the effective noise variance of the in-band tones.

70. The apparatus of claim 69, wherein the average effective noise variance is estimated by estimating a noise variance for the band-edge tones of one or more of the OFDM symbols, weighting the noise variance estimates, combining the weighted noise variance estimates, and scaling the combined weighted noise variance estimates.

71. The apparatus of claim 70, wherein the average effective noise variance is further estimated by weighting the guard tones of one or more of the OFDM symbols, combining the weighted guard tones, and scaling the combined weighted guard tones.

72. The apparatus of claim 71, wherein the weights applied to the noise variance estimates and the guard tones are such that the mean of the combined weighted noise variance estimates and the combined weighted guard tones is substantially equal to the effective noise variance in the absence of adjacent channel interference.

73. The apparatus of claim 69, wherein the channel estimates are time averaged over two or more of the OFDM symbols.

74. The apparatus of claim 73, wherein the channel estimates are time averaged using a non-causal means for filtering.

* * * * *